United States Patent [19]

Duffy et al.

[11] 4,100,882
[45] Jul. 18, 1978

[54] APPARATUS FOR MAKING LOCKING NUTS

[75] Inventors: Richard J. Duffy, Salem; Philip J. Rodden, Beverly, both of Mass.

[73] Assignee: USM Corporation, Farmington, Conn.

[21] Appl. No.: 734,383

[22] Filed: Oct. 20, 1976

Related U.S. Application Data

[63] Continuation-in-part of Ser. No. 704,294, Jul. 12, 1976, Pat. No. 4,054,688.

[51] Int. Cl.² .......................... B05C 7/02; B05C 19/00
[52] U.S. Cl. .................................... 118/620; 118/308; 118/313; 118/318; 118/319
[58] Field of Search ............. 10/10 P, 86 A; 118/319, 118/318, 308, 315, 313, 620; 427/181, 183

[56] References Cited

U.S. PATENT DOCUMENTS

| | | | |
|---|---|---|---|
| 1,185,889 | 6/1916 | Eberhart | 118/318 X |
| 3,592,676 | 7/1971 | From, Jr. et al. | 427/183 |
| 3,720,533 | 3/1973 | Gallagher | 427/185 |
| 3,894,509 | 7/1975 | Duffy et al. | 118/319 X |
| 3,896,760 | 7/1975 | Duffy | 118/308 |

*Primary Examiner*—John P. McIntosh
*Attorney, Agent, or Firm*—Benjamin C. Pollard; Richard B. Megley; Vincent A. White

[57] ABSTRACT

Improved apparatus and process for applying locking patches of resilient resin to internally threaded articles such as nuts having openings at both ends of the threaded portions in which apparatus and process, a support and treating member, preferably a rotatable, circular table with edge notches complementary to a portion of the exterior of a threaded article to be treated, receives a succession of threaded articles heated to a temperature above the melting point of the resin to be applied and moves the articles along a path for treatment with the axes of the threaded articles in an up and down position and with the openings at the upper and lower ends of the threaded portions substantially uncovered, conduits on the support and treating member are associated with each threaded article to direct particles of heat fusible resin upwardly through the opening at the lower end of the article against a portion of the threaded surface of the article to form a first deposit of resin on an area of the threaded surface during movement along a first portion of the treatment path and a turning device at an intermediate location on the treatment path turns each threaded article, as it reaches that location, a predetermined angle so that the conduit associated with the article directs resin against a further area of the threaded surface to form a second deposit of resin during movement along a further portion of the treatment path. The temperature of the article, the rate of movement along the treatment path, the supply of the resin particles, the location of the turning device, and the turning angle may be correlated so that thin edge portions of the first resin deposit may be spaced from or may be overlapped by thin edge portions of the second resin deposit up to an extent that the total thickness of resin in the overlapped portions may approximate the thickness of the central portions of the first and second deposits of resin.

9 Claims, 14 Drawing Figures

APPARATUS FOR MAKING LOCKING NUTS

BACKGROUND OF THE INVENTION

This application is a continuation-in-part of application Ser. No. 704,294, filed July 12, 1976, now U.S. Pat. No. 4,054,688.

Application Ser. No. 704,294 was copending with, repeated a substantial portion of the subject matter of, and added subject matter not disclosed in an earlier application Ser. No. 572,199 now U.S. Pat. No. 3,995,074.

The present invention relates to an improved process and apparatus for the manufacture of self-locking internally threaded elements and more particularly to a device for the continuous manufacture of elements such as fasteners wherein the self-locking feature is obtained through a deformable plastic patch secured onto the threaded internal surface of the element.

In U.S. Pat. No. 3,858,262 entitled "Method of Making Self-Locking Internally Threaded Articles" filed in the name of R. J. Duffy, and assigned to the assignee of the present invention, there is disclosed a method and apparatus for making a self-locking threaded element which avoids the difficulties of resin deposit on the end faces of the threaded element and is effective to deposit resin on the threaded surface in the selected area with a minimum of spatter on other portions of the threaded surface. In that method and apparatus as disclosed, a nut or other internally threaded member was heated, and while mounted with its axis in an up-and-down position the threaded surface was sprayed with finely divided resin particles which were caught and built up on the heated surface to form a plastic body.

In U.S. Pat. No. 3,894,509 there is disclosed an apparatus and method for mass production of such internally threaded elements including an automatic means to move a succession of internally threaded element through various stations in which the elements are loaded onto a conveying and treating member, a resilient resin locking patch is formed on the threaded surface of the elements by deposition of heat fusible resin powder and the elements are unloaded at a substantial rate.

While the apparatus and method disclosed in these patents and the locking action of the applied patch have proven quite satisfactory for most uses, it has been desired to provide greater locking torque for certain uses. Increase in the amount of resin applied to form a thicker locking patch gives some increase in locking torque but the increase obtainable is limited since an excessively thick patch causes difficulty in assembly and the generation of chips due to shearing off of portions of the patch.

It is an object of the present invention to provide an improved apparatus and method for the manufacture of self-locking internally threaded elements wherein locking bodies of resilient resin giving improved locking torque are formed by application of fine particles of heat fusible resin.

SUMMARY OF THE INVENTION

To these ends and in accordance with the present invention, there is provided an apparatus and process for applying resilient resin to internally threaded articles such as nuts having openings at both ends of the threaded portions in which the articles in heated condition are conveyed on a support in a path for treatment, conduits direct heat fusible particles to a first area of the threaded surface of each article on which a patch is to be formed, and a device turns the articles about their axes at an intermediate point along said path so that the conduits direct resin against second areas of said threaded portions during movement through the remainder of the path.

BRIEF DESCRIPTION OF THE DRAWINGS

For a more complete understanding of the invention, reference should be made to the following description of a preferred embodiment, taken in conjunction with the drawing thereof, wherein.

DESCRIPTION OF THE PREFERRED EMBODIMENT

In the following discussion, the apparatus and process method will be described primarily as they relate to the treatment of nuts but it is to be understood that the apparatus and process method will be useful for treatment of internally threaded articles open at both ends other than nuts.

According to the present invention we have discovered that in operation of the treating apparatus and method of the parent patents using comparable temperatures, resin supply rates, article supply rates and other conditions, major improvement in locking torque is secured by depositing a portion of the heat fusible resin particles on one area of the hot threaded surfaces and thereafter depositing the remainder of the resin particles on a further area of the threaded surfaces. Operating in this fashion, not only is the locking torque increased but difficulties due to unwanted deposition of resin on face portions of the nuts and on lead threads for starting the nuts are avoided.

Also in high speed treating apparatus of the parent patents, while the succession of nuts oriented in flat-to-flat relation resembles a chain which meshes with the notches of a threading table support visualized as a sprocket, the leading and trailing flats of each nut on the table support are in fact substantially radially disposed. Flats of adjacent nuts on the table support diverge and provide some clearance between outer portions of these radial flats and this clearance plus limited "give" of the adjacent nuts in their notches enables the nuts to be turned one flat by a simple turning device, such as a resilient presser member acting on the outer portion of the nuts counter to the movement of the table support, and to be restored to their notches in their turned position without removal of the nuts from the support. Since the resin applying conduits of the apparatus of the present patents are in fixed relation to the notches on the rotating table support, the combination of the turning device, disposed at an intermediate location of the path in which resin is applied to the nuts, with the notched table support and the fixed conduits enables deposition of a portion of the resin particles on first areas of the threaded surfaces until the turning device is reached and deposition of the remainder of the resin particles on further areas of the threaded surfaces during movement of the nuts through the remainder of the resin applying path.

Figure 1:
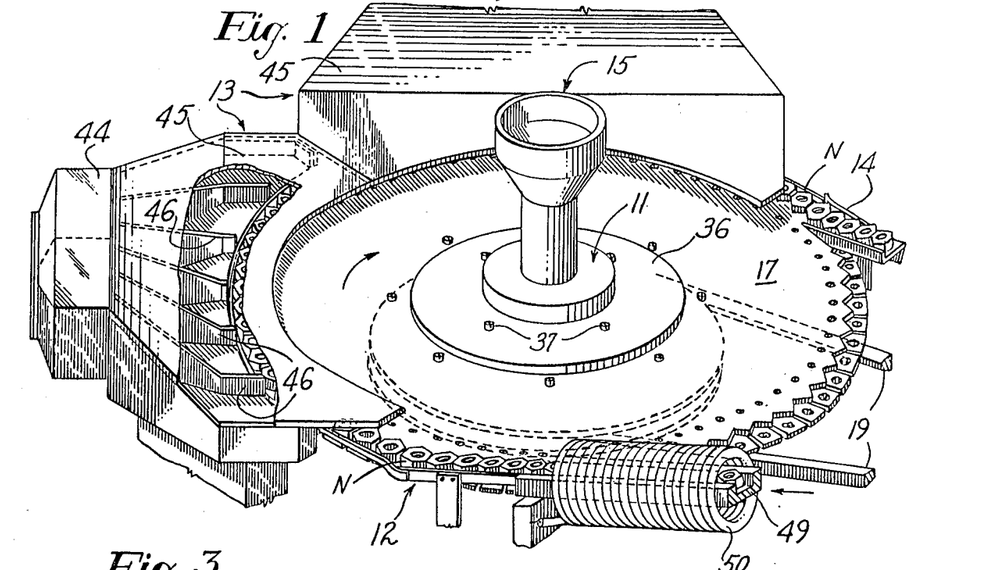
FIG. 1 is a perspective view showing a device for the manufacture of self-locking threaded fasteners constructed in accordance with the teachings of the present invention.
Figure 2:
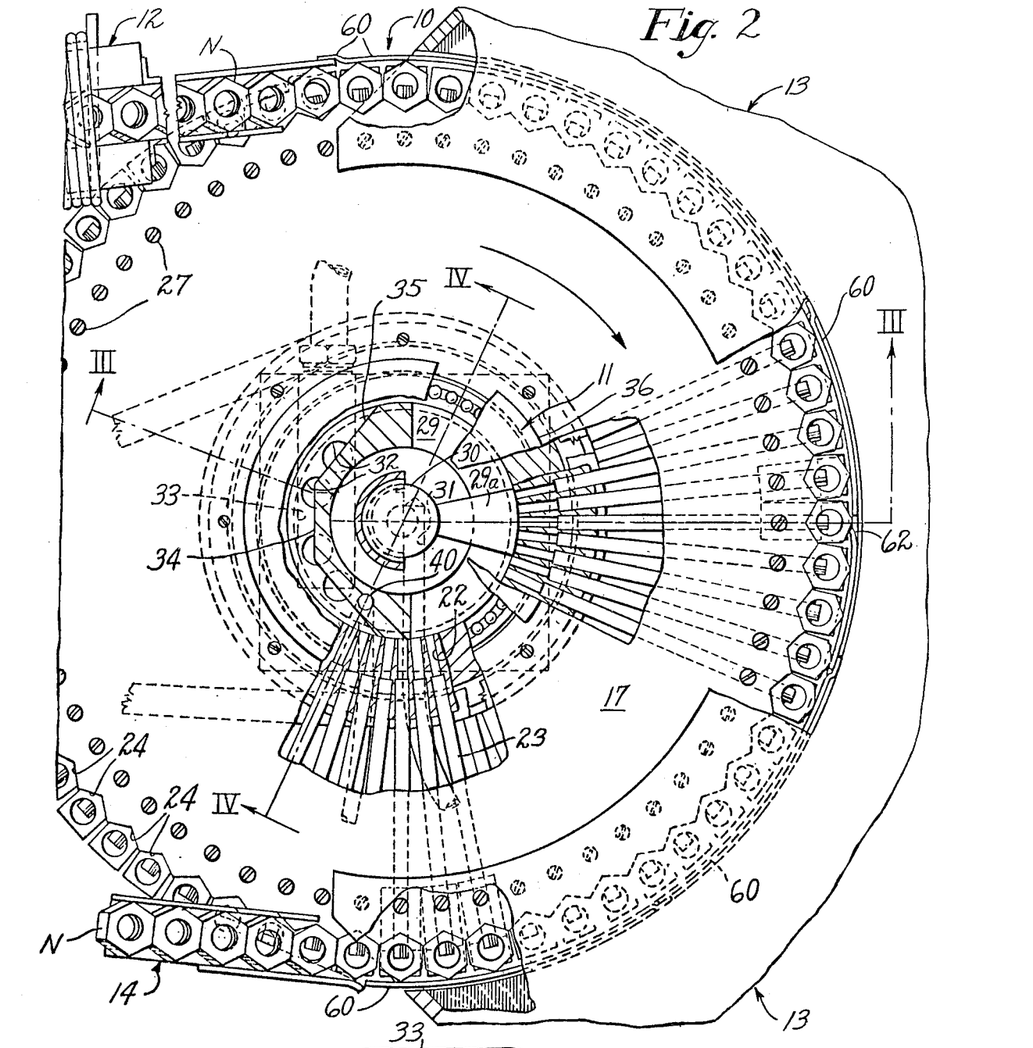
FIG. 2 is a top plan view of the device shown in FIG. 1 having portions of the structure broken away to reveal underlying features.

Referring to the drawing, and in particular to FIGS. 1 and 2, there is shown apparatus for the manufacture of a self-locking internally threaded article in the form of a hex nut N which generally comprises a rotatably mounted transport member in the form of a table 10 movable along a predetermined rotary path about its central axis, in the direction shown by the arrows of FIGS. 1 and 2.

As the table 10 is continuously rotated about a fixed housing 11, a point on the table 10 will be seen to pass through a plurality of stationary work areas which will be termed stages of the operation for the purposes of the present description.

During the first stage of operation, a loading chute 12 which is inclined downwardly toward the surface of the table 10 is effective to deposit the hex nut N onto the table, and during a next stage, a resilient thermoplastic material in powdered form is applied in two portions to angularly spaced areas of the internally threaded surfaces of the nut. This stage is substantially enclosed by a vacuum hood 13, the operation of which will be explained in detail hereinbelow.

During a next subsequent stage, a second upwardly inclined chute 14 having one end disposed adjacent the table 10 is effective to unload the nut N from the table 10, which is followed by the subsequent stage of operation which substantially covers that portion of the table 10 located between the unloading station and the loading station, and wherein the means for applying thermoplastic material to the nut N are purged of residual material, and are readied for the next sequence of operation.

It will be noted in FIG. 1, that the stationary housing 11 is provided with a funnel shaped hopper 15 which serves to receive the powdered resilient thermoplastic resin for application to the internal threads of the nuts N, which operation will be explained in detail below.

Referring now to FIGS. 2–5, and in particular to the table 10, the table is shown to comprise a hub 16 having a plate 17 affixed to its uppermost surface and a groove 18 for receiving a V-belt 19 which is connected to a motor (not shown). The hub 16 is slidingly engaged on the central housing 11 and is caused to rotate by the motor driven belt 19, the hub being supported by a pair of bearings 20 and 21.

Referring still to these FIGS. 2–5, the hub 16 is shown to have formed therein a plurality of circular cross section apertures 22 each having an opening internally toward the housing 11 and receiving at the opposite end a tube 23, the tube and aperture forming in combination a conduit means, as will be explained further in detail.

As best shown in FIG. 2, the outer periphery of the plate 17 is provided with a plurality of V-shaped slots or notches 24, each of which has a tongue 25 disposed below and extending outwardly from the respective slot or notch to form a pocket or cavity for receiving a threaded hex nut N, of the type shown. Each of the tubes 23 has a channel bracket 26 connected to it by welding or other means and a plurality of fasteners 27 serve to connect the bracket 26 to the plate 17, with the respective tongue 25 sandwiched therebetween. Each of the tongues 25 has a circular opening provided therein and the outer end of the tube 23 is bent upwardly at approximately a 45° angle to extend through the circular opening in the tongue, and slightly above the tongue to a position which would locate the outer end of the tube within a hex nut received in the pocket formed by the respective V-shaped slot or notch 24.

Figure 3:
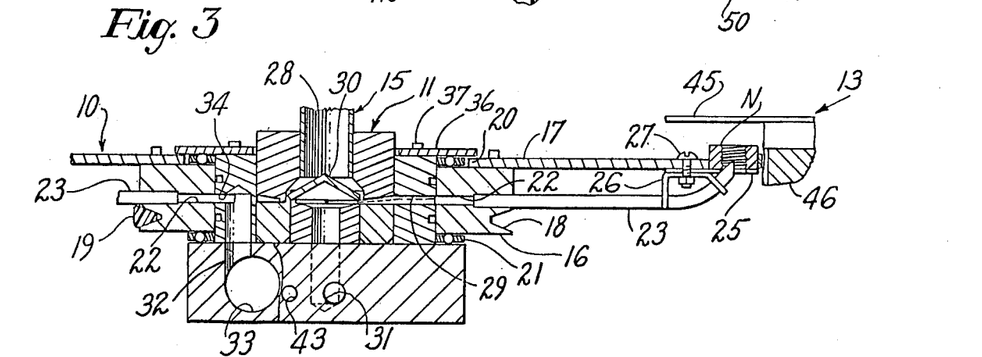
FIG. 3 is a sectional elevational view taken along the line III—III of FIG. 2 showing details of the construction.
Figure 4:
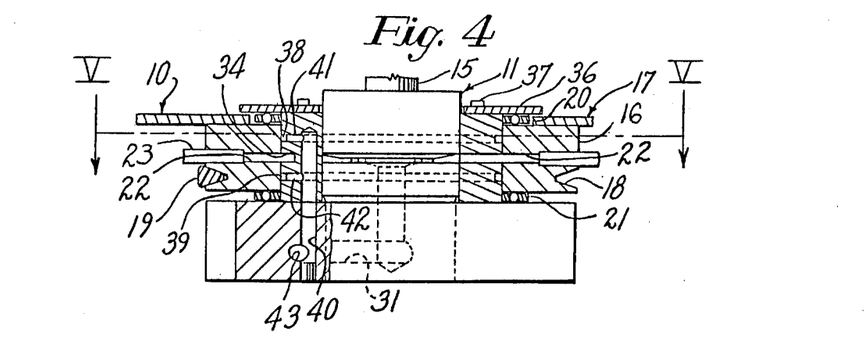
FIG. 4 is sectional elevational view taken along the line IV—IV of FIG. 2 showing further details of the structure.
Figure 5:
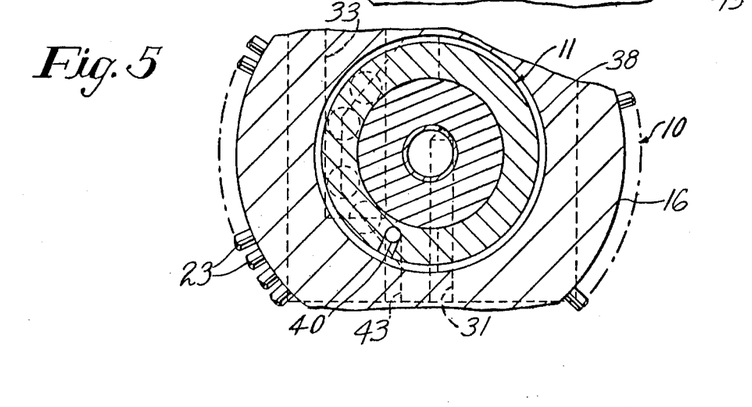
FIG. 5 is a sectional plan view taken along the lines V—V of FIG. 4 showing that portion of the structure in detail.

Referring in particular to FIGS. 3, 4 and 5, the housing 11 is seen to have formed therein a hollow central opening, or bore 28 into which the hopper 15 is introduced, and which extends to a point near the bottom of the housing. The bore 28 is flanged outwardly near its midpoint, and has a slotted opening 29 which extends for substantially 180° around the housing 11 except for a blocked section 29(a) intermediate the length of the slotted opening 29. The slot leads from the flanged out portion of the bore 28 externally of the housing 11 and is in alignment with the plurality of apertures 22, when the table 10 is located on the housing 11. A conical shaped divider 30 is located in the flanged out portion of the bore 28 and is attached to the wall of the bore at that portion of the wall which is not cut away by the slotted opening 29. Thus, the divider 30 separates the upper portion of the bore 28 from the lower portion over the entire circumference of the bore with the exception of that portion where the slotted opening 29 is located.

An inlet opening 31 extends into the bore 28 at its lowermost extremity and is connected to a source of fluid pressure such as an air pump (not shown).

Diametrically opposite the slotted opening 29 and near the outer edge of the housing 11 are located a plurality of vertical circular cavities 32, four in number, which are best shown in FIG. 2.

Each cavity 32 has its lower end terminating in a larger diameter chamber 33, and its upper end terminating at a second slotted opening 34 similar to the diametrically opposed slotted opening 29. In this instance, the slotted opening 34 extends from the outer periphery of the hub 11 over a circumference of about 150° to an inner wall 35 as shown in FIG. 2. The slotted opening 34 is in alignment with the apertures 22 and therefore forms a flow path from the tubes 23 through the chamber 33 to which a vacuum source (not shown) is connected, when the tubes 23 are moved into the area over which the opening 34 is formed.

Referring in particular to FIGS. 3 and 4, it will be noted from the construction that the table 10 is readily removable from the hub 11 by virtue of the removable retaining plate 36 which is secured by four fasteners in the form of screws 37. When the screws 37 are removed, the retaining plate 36 may be lifted from the structure and the table 10 removed and subsequently replaced with a table serving to receive internally threaded fasteners of a different size or shape than those which are accommodated by the table 10 shown.

Because of the necessity to provide a sliding fit between the table 10 and the central housing 11, there is a distinct possibility of material which is being transferred between the tubes 23 and the slotted opening 29, or the tubes and the slotted opening 34, tending to escape between the outer surface of the hub 11 and the inner surface of the hub 16 of the table 10. There is provided, therefore, a pair of circumferential grooves 38 and 39 formed in the hub 11 and extending completely around the hub. At a point adjacent the inner wall 35 of the slot 34 a vertical bore 40 extends from the bore 40 and is connected to a source of air pressure (not shown) for providing a fluid pressure in the bore 40. Thus, material having a tendency to find its way between the hub 16 and the housing 11 is inhibited from doing so, as any air flow occurring takes place from the grooves 38 and 39 into the openings 29 and 34.

Referring now to FIGS. 1 and 2, it will be observed that the vacuum hood 13 is divided into two portions for purposes of convenience only, and both portions taken together cover the area about the housing 11 wherein the slotted opening 29 is formed. That is, the entire area over which the thermoplastic resin in powdered form is fed through the tube 23 is covered circumferentially by the hood 13. Both of the portions of the hood 13 are constructed substantially the same and therefore only the first portion as shown in FIG. 1 will be described in detail.

Each of the hood portions is provided with a chamber 44 which is supplied with a negative pressure by vacuum producing means (not shown). A cover plate 45 extends outwardly from the hood 13 to a position over the table 10 which serves to cover a nut N located on the table. For the purpose of equalizing the vacuum throughout the hood 13, a plurality of partitions 46 are located within each of the portions of the hood 13 and serve to form a plurality of separate vacuum areas, each having substantially the same negative pressure to apply to the area above the nut N located adjacent to the opening of the hood.

Figure 6:
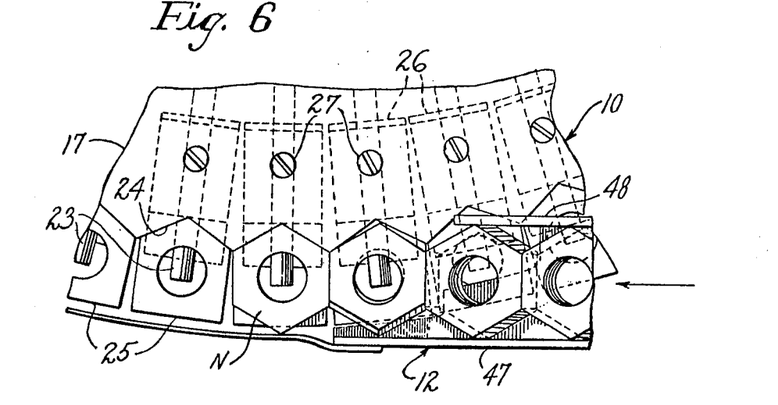
FIG. 6 is a plan view showing a portion of the structure depicted in FIG. 2, taken on an enlarged scale for clarity.
Figure 7:
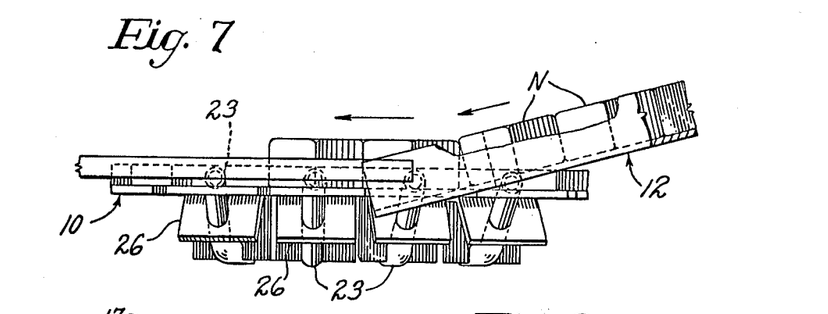
FIG. 7 is an elevational view of the structure shown in FIG. 6.

The feeding arrangement shown comprises the chute 12 which is supported adjacent the periphery of the table 10 and positioned with the lowermost discharge surface of the chute spaced slightly from the surface of the plate 17 and having an outer rail 47 extending beyond an inner rail 48 as best shown in FIGS. 6 and 7. The distance between the outer rail 47 and the inner rail 48 is substantially the width across the points of the hex portion of the nut N to be fed onto the table 10. Thus, as shown in FIGS. 6 and 7, the nuts orient themselves flat-to-flat when traveling down the chute 12 and are therefore aligned for engagement with the V-shaped slot 24 on the table 10. A segment 49 of the chute 12 is manufactured of a material with suitable non-inductive and heat-resistant properties, and extends through an induction coil 50 which is suitably sloped and located adjacent the chute segment for heating a nut N traveling through the segment. The nut N may be fed by any suitable commercial feeder, of the vibrating type or of any other type, and as such devices are well known in the art, they are not considered to be of importance in describing the present invention and therefore the feeder has not been shown.

As can be seen from FIG. 2, with the nuts oriented flat-to-flat, the succession of nuts may be visualized as a chain of which the points mesh with the 120° slots 24 of the plate 27 which may be visualized as a sprocket.

However, with respect to any given nut in the succession of nuts on the table 10, it will be seen that the flats of adjacent nuts define, with the walls of the notch related to the given nut, a deep slot of which the side walls defined by the flats of the adjacent nuts diverge due to the radial orientation of the nuts. The clearance between the flats of the given nut and the diverging walls of the slot provides limited freedom of rotation of the given nut which is important for turning of the nut as discussed below:

The rotation of the table 10 at uniform speed serves as the speed controller for the system. As each nut N approaches the lower end of the chute 12, it is lowered down over the orifice of a tube 23, and also gradually comes into meshing engagement with the V-shaped slot 24 of the plate 17. As the table 10 then rotates, the nut moves further forward. The nut is found to be guided into close engagement with the 120° slot by the outer rail 47 of the chute 12, even at speeds of approximately 600 fasteners per minute.

Figure 8:
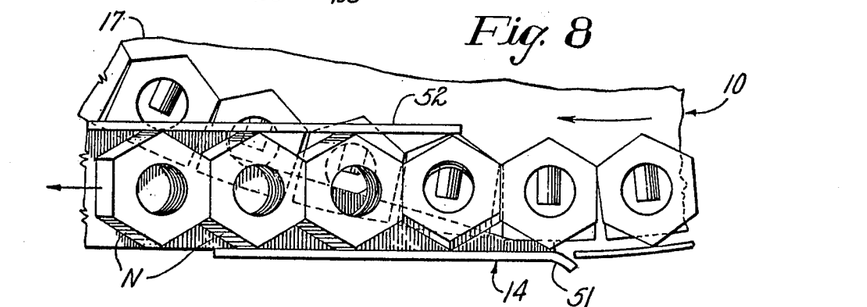
FIG. 8 is a plan view showing another portion of the structure depicted in FIG. 2, taken on an enlarged scale for clarity.
Figure 9:
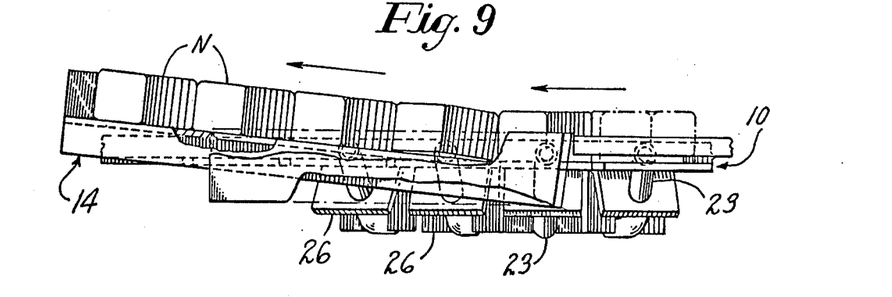
FIG. 9 is an elevational view of the structure shown in FIG. 8.

At the opposite side of the table 10 from the chute 12 there is located a similarly constructed chute 14, as best shown in FIGS. 8 and 9 taken in conjunction with FIG. 1. The chute 14 is effective to remove the nuts N from the table 10 and in a similar manner to chute 12 is sloped with its lowermost end, which in this instance is the nut receiving end, disposed adjacent the top of the table 10 and has an outer rail 51 which extends beyond an inner rail 52, both rails being spaced substantially the distance across the hex portion of a nut N. The uppermost end of the chute 14 may be left open providing for the nuts N to be dropped into a receptacle (not shown) or may lead to another chute or conveyance for carrying the nuts to a subsequent work or storage area.

With respect to the particular construction of the chutes 12 and 14, the outer rail 47 of the chute 12, as viewed in FIG. 6, forms a means for guiding the nut N into the proper location in the V-shaped slot 24 of the table 10 after which the nut may be held in place by resilient pressure means such as spring clips 60 to provide a radial retaining force to the nuts.

Figure 10:
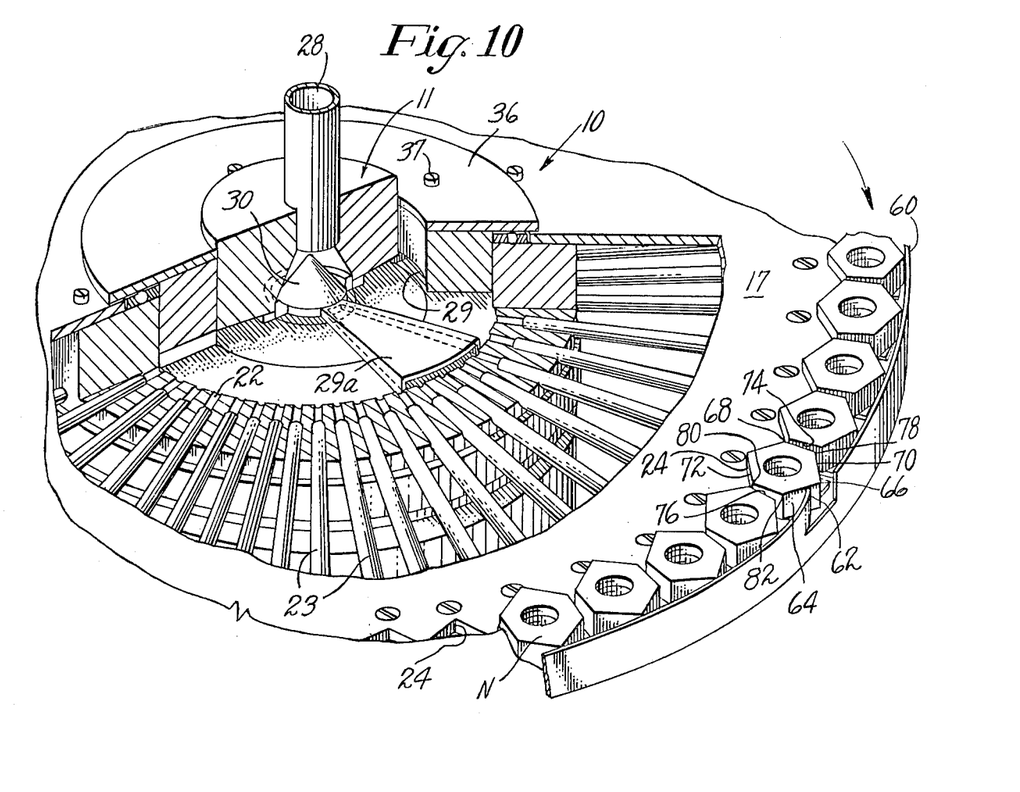
FIG. 10 is a perspective view of the device shown in FIG. 1 having portions of the structure broken away to show underlying features.
Figure 11:
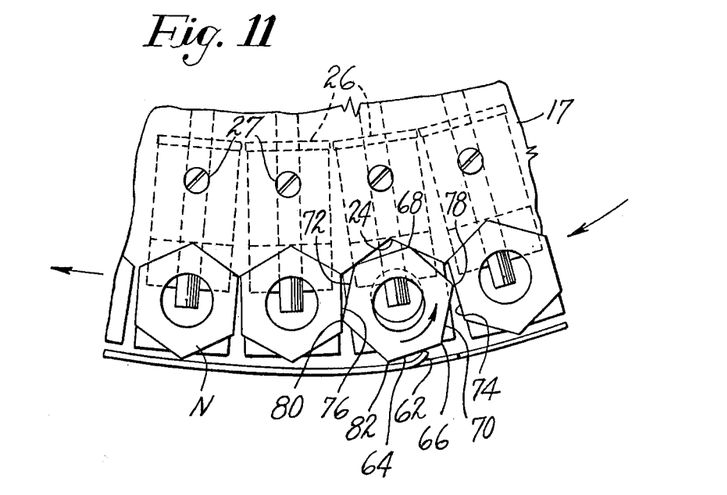
FIG. 11 is a fragmentary plan view on an enlarged scale of the structure shown in FIG. 10 illustrating the nut turning action.

At an intermediate portion of the path of travel between chute 12 and chute 14 corresponding to the location of the blocked section 29(a) in the slotted opening 29, there is provided a device for turning the nuts. In hex nuts, the angle of turn will be 60° or a multiple of 60° corresponding to the radial angle between adjacent corners of the hex nuts. The turning device shown is a resilient finger 62 disposed to engage an outer flat 64 of a hex nut N adjacent the outermost corner 66 as the nut N is moved by the table and to create a turning moment which rotates the nut N out of its initial position as shown in FIGS. 10 and 11. The clearance between the nut N being turned and the diverging flats of adjacent nuts facilitates initial rotational movement so that the relatively small turning moment is sufficient, as shown in FIG. 10 to turn the nut N somewhat more than ½ the radial angle 60°, required to bring the corner 68 of the nut N into alignment with the angle of the notch 24. This initial movement brings the opposed flats 70 and 72 of the nut N into engagement with the flats 74 and 76 of the adjacent nuts to spread them apart against the resilient retaining action of the springs 60. The pressure of the flats 74 and 76 against the corners 78 and 80 of the nut N being turned, and the force of the spring 60 against the corner 82 of that nut N completes the turning and returns the nut N to its notch in turned position with a new area of threaded surface exposed to particles of heat fusible resin from the tube 23. During the turning action, the blocked section 29 (a) allows passage of air but stops flow of resin particles through the tube 23 to avoid deposition of resin on undesired areas of the nut. It will be understood that a nut may be given additional turns for greater spacing between resin deposits or for additional resin deposits if desired by providing additional turning devices and appropriate blocked sections.

When nuts have been carried to the discharge point, the outer rail 51 of the chute 14 serves to retain the nut in registry with the slot 24 until such time as the nut is lifted above the table and the inner rail 52 serves to combine with the rail 51 to guide the nut along the chute to its destination.

In operation, the apparatus as herein disclosed is first prepared by loading the hopper 15 with a thermoplastic resin in powdered form. The material may be a powder which is a mixture comprising a major portion of powdered polyamide resin, (suitably nylon 11), and a minor proportion of epoxy resin having a particle size distribution such that less than 2% is retained on a No. 70 sieve, about 90% retained on a No. 140 sieve and about 5% passing a No. 325 sieve. This is substantially the same material as disclosed in the prior referenced U.S. Pat. No. 3,995,074 assigned to the assignee of the present invention.

While the means for introducing thermoplastic resin in powdered form to the apparatus has been shown as a funnel type hopper 15, it should be understood that for the purposes of the invention the material could be provided from a remote source and continuously supplied by a suitable conduit to the housing 11. It should also be understood that the flow of resin material is metered by valving or other means well known in the art so as to control flow rate according to the production rate, nut size, thread size or temperature variations.

With the material introduced into the apparatus, the means for providing a vacuum to the chamber 33 and the duct 43, and the means for providing air pressure to the inlet opening 31 are activated. Also external to the housing 11, the means for providing a vacuum to the hood 13 is initiated, and the induction coil 50 is energized to provide heating of the nuts N as they are directed along the chute 12.

With the preliminary steps set forth above having been taken, the apparatus is in the ready state and the motor means for driving the belt 19 and means for feeding the nuts N onto the chute 12 are activated to initiate processing of a typical batch of internally threaded fasteners. As the table 10 rotates at about 10 revolutions per minute in the direction of the arrows shown in FIGS. 1 and 2, the nuts N are introduced into the chute 12 and travel flat-to-flat through the induction coil 50 where each nut is raised to a temperature sufficient to cause the above described thermoplastic powder to adhere to the threaded surface of the nut when contacted thereby, and to be fused by heat from the surface to form a continuous plastic body. As a nut N approaches the table 10 it is retained on the chute 12 by the outer rail 47 until it is in registry with a V-shaped slot 24 and thereby positioned over a respective tube 23 disposed with its discharge opening at the threaded opening of the nut. It is important that the slots or notches 24 be so spaced that the nuts N are not wedged together so that there is a little play between adjacent nuts N in the succession of nuts. The table 10 is rotated at a constant speed (about 10 revolutions per minute) and each nut N remains on the table for about ½ revolution or about 3 seconds with the discharge opening of the hollow tube 23 disposed to project slightly into the threaded opening of the nut.

As the table 10 rotates, each tube 23 is moved such that its respective aperture 22 comes into registry with the slotted opening 29 and the nut located adjacent the tube discharge opening is simultaneously disposed below the cover plate 45 of the hood 13. Air is supplied through the inlet opening 31 and into the lower portion of the hollow bore 28 where it passes into the slotted opening 29. The air flows horizontally through a converging area to the slotted opening 29 past the powder slot formed by the wall of the bore 28 and the conical shape divider 30 where it picks up the powder and then passes through a diverging area. The powder is fed at a uniform rate to the powder slot and the converging-diverging areas produced by the air passing from the portion of the bore 28 adjacent the divider 30 and into the slotted opening 29 provides a slight suction or "Venturi effect" at the powder slot which is considered to draw the powder into the air stream. The slotted opening 29 and its powder slot between the divider 30 and the bore 28 extend for about 180° about the housing 11, the deposit of powder on the first area of threaded surface of the heated nut takes place continuously during travel of the nut N to the segment of the path corresponding to the blocked section 29(a). At this position, the turning member operates to turn the nut about the axis of its threaded section and return it to the notch 24 in turned position with a new area of the threaded surface available for deposition of powder during the portion of the path of travel onwardly of the blocked section 29(a).

Deposition of resin particles in two portions with the deposition area in fixed relation to the resin supply conduits during deposition of each portion appears to be important for the development of a desirable locking body. That is, on each of the areas on which the resin is deposited, the first applied resin particles soften and adhere to the hot threaded surfaces and this softened resin is particularly effective for catching later applied particles progressively to build up the deposit of resin in the desired thickness and contour and to transfer softening heat from the hot threaded surface to melt the later applied particles so that the applied particles coalesce to a continuous body.

The thickness and to some extent the lateral dimensions of the resin deposits on the areas may be controlled by the temperatures of the nuts, the rate of supply of the resin particles and air, and the length of time during which resin particles are applied to the areas, i.e.

the time required for a nut to be conveyed along one of the portions of the treatment path. The resin deposits are thicker at their centers and taper uniformly towards their edges. If desired, the deposits may be controlled such that the edges of the deposits overlap to an extent that the combined thickness of the overlapping edge portions approximate the thickness of the centers to form in effect a unitary patch over the combined area of the deposits to give a maximum locking effect for the locking patch area. The deposition may of course, be controlled to provide substantially separate locking patches or any condition between separate patches and a unitary patch.

In the embodiment shown, the table 10 is provided with about 60 tubes 23, each tube projecting slightly into the nut N at approximately 45°. The powder is thus guided through the tube 23 to strike the internal threads of the fastener at a point slightly above the lowermost thread and the air powder flow is adjusted such that very little powder impinges upon the uppermost thread. As the tube 23 and the associated nut N rotate together over the 180° segment, a steady, rather uniform flow of powder is projected into the nut except at the intermediate portion where the nut is turned and flow of powder is cut off by the blocked section 29(a). Simultaneously, the vacuum hood 13 is drawing excess material into the hood and away from the nut N during the 180° segment. The flow of "vacuum air" through the internal opening in the nut, and across the top of the nut, prevents powder from adhering to the nut except where powder impinges directly from the tube 23 onto the nut threads.

After the tube 23 and associated nut N pass from the stage of operation where the aperture 22 is in registration with the slotted opening 29 (and consequently from beneath the hood 13), there is a small arc of about 15° wherein the aperture 22 faces the outer periphery of the housing 11, and therefore the tube 23 is substantially shut off. At about this point in the table movement, the nut confronts the leading edge of the chute 14 and while still engaged in the V-shaped slot 24 registers with the rail 51 of the chute. The nuts N are then forced into flat-to-flat engagement by continuous movement of the table 10 and are moved in a continuous stream between the inner rail 52 and outer rail 51 of the chute 14, to be removed from the table 10 to a receiving point.

During the next approximately 150° arc of rotational path, a next stage of operation takes place wherein each of the tubes 23 has its apertures 22 brought into registration with the slotted opening 34 which is connected to the chamber 33 to which a vacuum is being applied. Thus, through an arcuate distance of 150°, each of the tubes 23 has a vacuum drawn on it which evacuates any excess material from the tube 23 and the aperture 22.

As may be envisioned, in providing a tube 23 which is bent upwardly at a 45° angle to distribute the powdered material in the described manner on the internal threads of the nut N, particles of material may become impinged on the outermost surface of the tube orifice and therefore would be deposited on a subsequent nut as the nut in the heated condition was placed on the table and moved across the discharge orifice of the tube. By providing the vacuum chamber 33 and drawing the material inwardly away from the orifice of the tube 23 the material is substantially eliminated at the orifice, and the probability of depositing material at an undesirable location on a subsequent fastener is thereby substantially eliminated.

Figure 12:
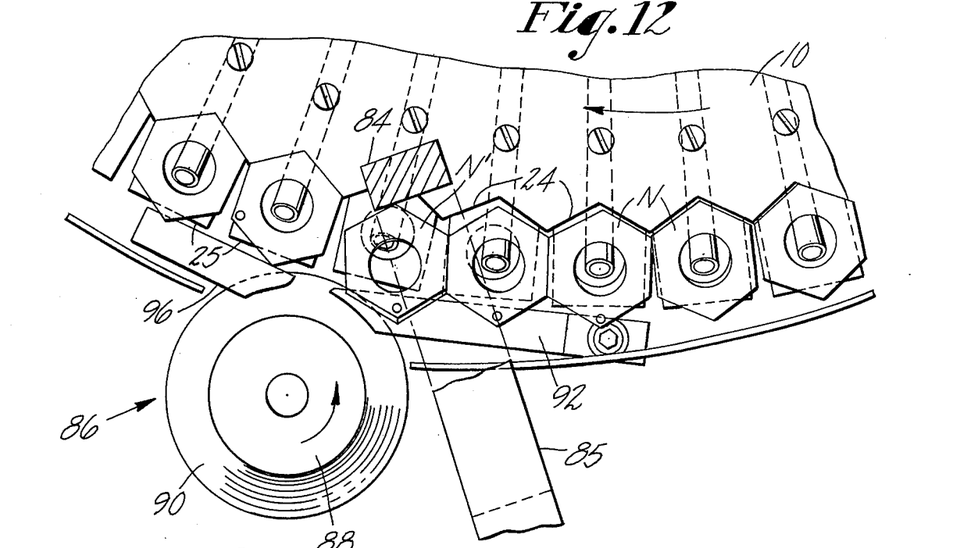
FIG. 12 is a fragmentary plan view on an enlarged scale and with portions broken away of a device similar to that shown in FIG. 1 but with a different embodiment of nut turning device.
Figure 13:
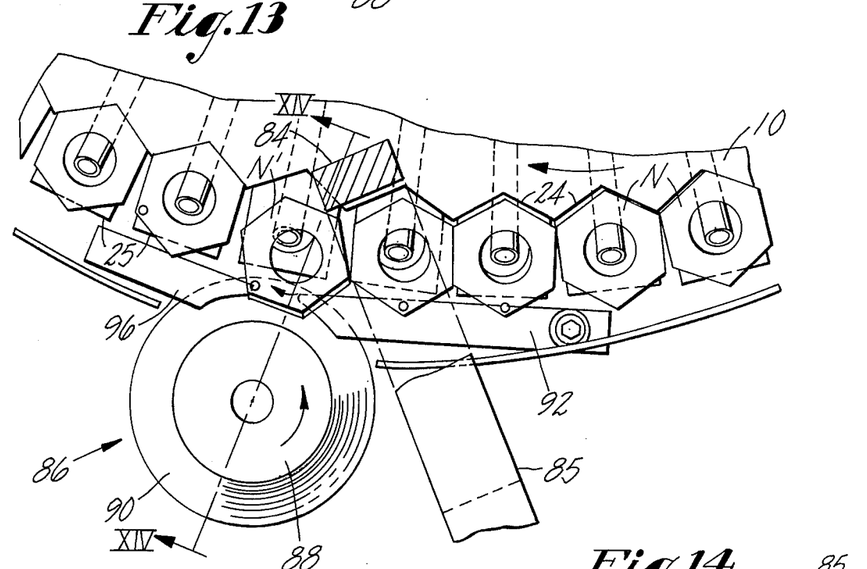
FIG. 13 is a fragmentary plan view as in FIG. 12 illustrating a stage in the nut turning sequence subsequent to the stage shown in FIG. 12.
Figure 14:
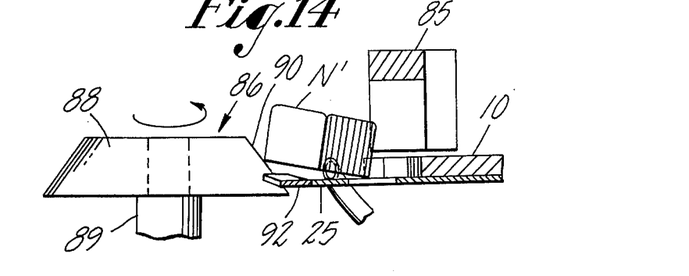
FIG. 14 is a fragmentary diagrammatic elevational view with parts broken away taken in the direction of the arrows at the end of lines XIV—XIV of FIG. 13.

A further form of the nut turning device, (see FIGS. 12, 13 and 14) useful in connection with the nut transporting arrangement shown in FIG. 1 includes a wedge 84, supported by the arm 85 above the rotating table 10 for wedging the nuts N out of their respective notches 24 as they are carried past the wedge, and a device 86 which may be a wheel 88, as shown in FIGS. 12, 13 and 14, or other suitable arrangement such as a belt, a jet of gas, a moving arm and so on, for urging the outer portions of the nuts forward and to create in combination with the wedge a turning moment to rotate the nuts. The angle of the wedge may be such as to be roughly parallel to the leading inner face of a nut N carried past it by the table 10.

In the form shown in the drawing, particularly FIG. 14, the device 86 is a small wheel 88 mounted on shaft 89 and having a sloping rim surface 90 with an angle which may, for example, be about 40° from the horizontal. The wheel 88 is positioned opposite the wedge 84 and somewhat less than a nut length further along in the direction of movement of the table 10, so that as a nut N is pushed from its notch 24 by the wedge 84, the outermost corner of the nut rides up on the sloping rim surface 90. Shaft 89 is driven by suitable means (not shown) to provide a surface speed of the sloping rim surface 90 at the level at which the nut engages the rim surface which is greater, suitably 1.5 times greater, than the rim speed of the table 10.

In a preferred form of this turning device, a ramp 92 is disposed to engage the undersurfaces of the nuts N starting at a distance two or three nut lengths before the nuts N reach the wedge member 84. This ramp 92 has a slight upward slope to raise the nuts N somewhat above the tongues 25 on which they rest to bring the nuts into best position for engagement with the sloping rim surface 90 of the small wheel 88 when the nuts N are forced outwardly by the action of the wedge 84.

In operation of this form of turning device, as shown in FIG. 12 the retarding action of the wedge 84 on a nut $N^1$ moved against it by rotation of the table 19 packs together two or three nuts preceding the wedge 84 so that their adjacent faces are in all over contact and the two or three nuts move in a straight line out tangentially from the notches 24 at the rim of the table 10. The packing together of the nuts and the tangential movement ensure adequate turning space for the nut $N^1$ as it is carried past the wedge member 84 and wheel 88. To aid in following the turning of the nuts, the corners of the nuts opposite the corners initially in the notches 24 have been marked in FIGS. 12 and 13 with small circles. As shown in FIGS. 13 and 14, when nut $N^1$ reaches the wedge 84 and is pushed out by the wedge, the corner marked with a circle of the nut $N^1$ opposite the corner which was in the notch 24 rides up on the sloping surface rim 90 of the small wheel (see FIGS. 13 and 14) and since the speed of the rim surface 90 is greater than the rim speed of the table 10, that corner is urged forward by the wheel 88 while the corner adjacent the notch 24 is retarded to create a turning moment to rotate the nut in the direction indicated by the arrow so that a corner of the nut adjacent the corner originally in the angle of the notch 24 is brought into registry with the angle of the notch 24.

After turning the desired amount as described above, a return of the nut $N^1$ to a position with its faces in contact with the sides of a notch 24 of the table 10 is assisted by the slope of the rim surface 90 of the wheel 88 forward of the line between the centers of the table 10 and of the wheel 88 and a secondary ramp 96 is preferably provided following the wheel 88 to prevent undesired tipping of the nut as it leaves the rim surface 90. The sloping upper surfaces of the tubes 23 may also assist in bringing the nut back to the desired close relationship with the sides of the notch 24 in the table 10.

The following example is given as a possible aid in understanding the invention more fully; but it is to be understood that the present invention is not limited to the particular materials, conditions, or procedures of the Example.

EXAMPLE

A continuous succession of ⅜ inch - 16 hex nuts was supplied in flat-to-flat relation to the loading chute 12 of an apparatus as shown in FIGS. 1 to 11, with the table 10 rotating at about 4.3 revolutions per minute and a resin feed of about 23 grams per minute of a mixture of powdered polyamide resin (nylon 11) and a minor proportion of epoxy resin. The mixture had a particle size distribution such that less than 2% was retained on a No. 70 Sieve, about 90% was retained on a No. 140 Sieve and about 5% passed a No. 325 Sieve. In passing down the chute 12, the nuts were heated by the high frequency induction coil 50 to a temperature of about 575° F. and then moved into registry with the V-shaped notches 24 of the support table 10 with their lower faces resting on the tongues 25 of the table and with the lower openings of the nuts generally aligned with the openings in the tongues so that the discharge ends of the particle directing conduits or tubes 23 extend within the open lower ends of the nuts for directing resin particles against the threaded surfaces of the nuts. As the table rotated, air and entrained resin particles flowed from the slotted opening 29 through the conduits 23 and against the hot threaded surfaces to build up deposits on first areas of the threaded surfaces of the nuts.

Approximately halfway along the arcuate path of the nuts from the loading chute 12 to unloading chute 14, the supply of resin powder to the conduits associated with the nuts reaching this location was blocked by the segment 29(a) and the nuts were turned one flat by the turning device 62. After the nuts had been turned and moved past the turning device, supply of resin to the conduits 23 associated with the nuts was resumed to build up a deposit on a further area of the threaded surface. Nuts carried to the unloading chute were lifted by the chute 14 away from the support table 10 and pushed up the chute 14 by successive nuts reaching the chute.

After cooling, the nuts were tested for locking torque using Grade 5 zinc phosphate and oil finished hex head screws. The nuts were seated to 3,200 pounds before prevailing torque was measured.

Also for comparison, a succession of identical nuts was treated using the same conditions and the same machine except that the blocking segment and turning device had been removed so that all resin was deposited in a single area.

The results of the torque tests of the nuts prepared using the process and apparatus of the present application with the nuts prepared without the improvements of the present application are given in the following table:

|  | Installation | 1st removal max/min | 5th removal max/min |
|---|---|---|---|
| Standard nuts* | 69 | 36/25 | 28/17 |
| Nuts rotated 60° * | 61 | 50/37 | 39/27 |
| Specification | 80 max | 12/5 | 8.5/4 |

*Values average of 5 tests in lbs.-inch.

Having thus described out invention, what we claim as new and desire to secure by Letters Patent of the United States is:

1. Apparatus for applying locking patches of resilient resin to a succession of internally threaded articles having openings at both ends of the threaded portions comprising:
   a feeder to supply said threaded articles in substantially continuous succession;
   a support for receiving said threaded articles from said feeder for conveying them in a first substantially fixed relation with respect to said support for a first portion of a path for treatment of successive articles with the axes of their threaded portions in an up and down position and with the openings at the upper and lower ends of the threaded portions substantially uncovered;
   means for heating said threaded portions of said articles to a temperature above the softening point of resin to be applied;
   means associated with each of said articles and in substantially fixed relation to a first resin deposition area of threaded surface of its associated article for directing particles of heat fusible resin upwardly through said openings at the lower ends of each of said articles against said first area of each of said threaded portions of said articles in said first portion of said path to cause said resin particles to be softened by heat from said threaded portions and to build up a deposit on each said first area; and
   means between said first portion and a second portion of said path acting on successive articles on said support to turn them about the axes of said threaded portions through a predetermined angle from said first relation to a second substantially fixed relation with respect to its associated directing means and said support for said second portion of said path to position a further area of each of said threaded portions, angularly spaced from each said first area, to receive resin particles from said directing means and to build up a deposit on said further area of each of said articles in said second portion of said path.

2. Apparatus as defined in claim 1 in which said means for directing resin particles includes conduits of which the upper ends extend into the openings at the lower ends of said threaded portions.

3. Apparatus as defined in claim 2 in which means are provided for interrupting flow of particles through conduits during turning of the threaded articles into which the upper ends of said conduits extend.

4. Apparatus as defined in claim 3 for applying locking patches of resilient resin to internally threaded articles having openings at both ends of the threaded portions and having external flats at angles to each other for engagement by turning devices, in which said support has surface portions for cooperative engagement with flats on threaded articles conveyed on said support; and said predetermined angle corresponds to the angle between flats of a threaded article or a multiple thereof whereby said means to turn said article brings a further flat of each of said articles into cooperative engagement with a support surface portion in said second portion of said path.

5. Apparatus as defined in claim 3 in which said internally threaded articles are nuts having flats for engagement with nut-tightening devices, said support for receiving said threaded articles and conveying them in a path for treatment includes notches substantially complementary to and in contact with a pair of flats of nuts to be treated and bases at the lower portions of said notches for supporting said nuts with the axes of their threaded portions in an up and down position and with the openings at the upper and lower ends of the said nuts substantially uncovered, said conduits for directing resin particles against said threaded portions are mounted on said support in fixed relation to said notches, and said turning means includes a device to displace said nuts from their positions in said notches, exert a turning moment on the nuts and return the nuts to their notches with one flat of said pair of flats moved out of contact with the notch and a flat adjacent the other flat of said pair moved into contact with the notch.

6. Apparatus as defined in claim 5 in which said nuts are hex nuts, said support is constructed for receiving and discharging a succession of said nuts and includes a rotatable, circular table for carrying said nuts in an arcuate path, said notches are V-shaped and arranged so that when said hex nuts are in said notches a first pair of opposed flats of each nut is oriented substantially in a direction radial of said table, said notches being disposed so that said opposed flats are closely adjacent flats of nuts in adjacent notches in portions of said flats close to the center of said table and are spaced from flats of adjacent nuts in portions furthest from said center, a resilient pressure member is disposed and arranged for sliding relation to nuts disposed in said notches to exert radial force for retaining said nuts in said notches during movement in said arcuate path, and said turning means includes a member mounted for engagement with radially outer portions of nuts moving through said intermediate location to exert a force counter to the direction of movement of said nuts and to create a turning moment to rotate said nuts sufficiently that the force exerted by the flats of nuts in adjacent notches and the radial force of said pressure member will bring to substantially radial direction a pair of opposed flats of said nut adjacent to said first pair of opposed flats.

7. Apparatus as defined in claim 5 in which said nuts are hex nuts, said support is constructed for receiving and discharging a succession of said nuts and includes a rotatable, circular table for carrying said nuts in an arcuate path, said notches are V-shaped and arranged so that when said hex nuts are in said notches a first pair of opposed flats of each nuts is oriented substantially in a direction radial of said table, said notches being disposed so that said opposed flats are closely adjacent flats of nuts in adjacent notches in portions of said flats closest to the center of said table and are spaced from flats of adjacent nuts in portions farthest from said center, and said turning means includes wedging surface means mounted for engagement with radially inner portions of nuts moving through said intermediate location to displace said nuts from their positions in said notches and exert a force on said inner portions counter to the direction of movement of said nuts, and a device to apply force on radially outer portions of said nuts in the direction of movement of said nuts whereby the forces on said radially inner portions and on said radially outer portions cooperate to create a turning moment to rotate said nuts to bring to substantially radial direction a pair of opposed flats of said nut adjacent to said first pair of opposed flats.

8. Apparatus as defined in claim 7 in which said device to apply force on said radially outer portion of said nut comprises a surface member sloping upward away from said table and spaced from said wedge a distance such that radially outer portions of nuts displaced by said wedge ride up on said surface member and means to move said surface member at a linear speed greater than the rim speed of said table to apply a force on said outer portions in the direction of movement of said nuts.

9. Apparatus as defined in claim 8 in which said surface member is a wheel having a rim of which surface portion adjacent said table slopes upward away from said table.

* * * * *